United States Patent [19]

Sellstrom et al.

[11] Patent Number: 4,828,879
[45] Date of Patent: May 9, 1989

[54] POLYMER CONCRETE COMPOSITION FOR CEMENTITIOUS ROAD REPAIR AND OVERLAY

[75] Inventors: Kathy B. Sellstrom, Pflugerville; Harold G. Waddill, Austin, both of Tex.

[73] Assignee: Texaco Inc., White Plains, N.Y.

[21] Appl. No.: 79,384

[22] Filed: Jul. 30, 1987

[51] Int. Cl.$^4$ .............................................. C08G 59/56
[52] U.S. Cl. .................................... 427/136; 264/36; 427/140; 528/111; 523/466
[58] Field of Search ............... 427/136, 140; 528/111; 264/36

[56] References Cited

U.S. PATENT DOCUMENTS

| | | | |
|---|---|---|---|
| 2,943,953 | 7/1960 | Daniel | 427/140 |
| 2,948,201 | 8/1960 | Nagin | 427/136 |
| 3,224,346 | 12/1965 | Simonson | 427/140 |
| 3,496,138 | 2/1970 | Sellers | 528/111 |
| 4,180,166 | 12/1979 | Batdorf | 427/140 |
| 4,189,564 | 2/1980 | Waddill | 528/111 |
| 4,487,805 | 12/1984 | Sellstrom | 528/111 |

Primary Examiner—C. Warren Ivy
Attorney, Agent, or Firm—Jack H. Park; Kenneth R. Priem; Richard A. Morgan

[57] ABSTRACT

A polymer concrete system has been discovered which is useful in road overlay and repair. The binder for this aggregate-filled system consists of a liquid opoxy resin and triethyleneglycol diamine or tetraethylene glycol diamine curing agent. A piperazine accelerator ensures adequate strength development after short cure times at ambient temperatures.

The binder-aggregate system is relatively flexible, has excellent compression and flexural strength and adheres well to the substrate. The system is distinguished by its fast cure to a compression strength of 3000 psi which will support automotive traffic.

12 Claims, No Drawings

POLYMER CONCRETE COMPOSITION FOR CEMENTITIOUS ROAD REPAIR AND OVERLAY

FIELD OF THE INVENTION

This invention is a method for repairing or resurfacing cementitious concrete roads. The method comprises the application of an epoxy resin binder-aggregate composition.

DESCRIPTION OF RELEVANT METHODS IN THE FIELD

Epoxy resins constitute a broad class of polymeric materials having a wide range of physical characteristics. The resins are characterized by epoxide groups which are cured by reaction with catalysts or curing agents to provide cured epoxy resin compositions with certain desirable properties.

U.S. Pat. No. 4,487,806 to K. B. Sellstrom and H. G. Waddill teaches a decorative epoxy resin aggregate binder composition. The composition comprises a vicinal polyepoxide, a stoichiometric amount of polyoxypropylene glycol diamine curative, nonylphenol and m-xylylene diamine. The composition is used to bind aggregate to cement surfaces such as patios and driveways of residential houses. The composition is a clear coating intended for outdoor use, which is noted for not yellowing with exposure to sunlight. U.S. Pat. No. 4,487,805 to K. B. Sellstrom teaches a decorative epoxy resin binder-aggregate composition. The composition comprises a vicinal polyepoxide, a stoichiometric amount of polyoxypropylene glycol diamine curative, nonylphenol, N-aminoethylpiperazine and a substituted benzotriazole ultraviolet light absorber. The composition is used to bind aggregate to large cement surfaces such as patios and driveways of residential houses. The composition is noted for not yellowing over time with exposure to sunlight.

U.S. Pat. No. 3,496,138 to R. F. Sellers and C. F. Pitt teaches curable epoxy resin compositions. These compositions include the reaction product of a diepoxide with a diamine such as the diamines of ethylene glycol, diethylene glycol, poly(ethylene glycol), propylene glycol, butylene glycol, etc. These compositions were used as adhesives and as coatings.

U.S. Pat. No. 3,236,895 to J. M. Lee and J. C. Winfrey and U.S. Pat. No. 3,462,393 to Legler are pioneer patents. They describe a series of amine compounds which are solids or liquids and have utility particularly in curing epoxy resins. The amine compounds have the general formula:

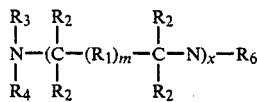

wherein R's are selectively defined as hydrogen, alkyl radicals and alkylene oxide radicals and x and m are defined integers.

U.S. Pat. No. 3,875,072 to H. G. Waddill teaches an accelerator for curing epoxy resins. The accelerator comprises piperazine and an alkanolamine in a weight ratio of 1:8 to 1:1. A number of alkanolamines are taught with triethanolamine preferred. U.S. Pat. No. 4,189,564 to H. G. Waddill teaches the accelerator comprising piperazine, N-aminoethylpiperazine and an alkanolamine. The accelerators are said to be synergistic for accelerating the curing of a polyglycidyl ether of a polyhydric phenol cured with a polyoxyalkylene polyamine at ambient or elevated temperatures. Such amines include polyoxypropylene diamines of the formula:

wherein x ranges from 2 to 40.

Decorative Aggregate Studies I–IV (Texaco Chemical Company; TSB-1195, -1196, -1198, and -1199) describe the formulation of weatherable epoxy systems for binding decorative aggregate to concrete.

Gupta, Kar, and Mani, "Effect of Binder Content and Coupling Agents on Mechanical Properties of Epoxy-Aggregate Composites", *Journal of Reinforced Plastics and Composites*, Vol. 1 (October, 1982), pp. 370–377, discusses the effect of binder:filler ratios and the use of silane coupling agents in an aggregate-filled epoxy system cured with a polyamide resin.

There is a need in the art for an epoxy resin formulation for repairing faults and for coating cementitious roads which is flexible and will cure to bear an 3000 psi traffic load in the shortest time, yet remain workable during application.

SUMMARY OF THE INVENTION

The invention is a method for repairing a fault in a cementitious road. The method comprises applying an aggregate and binder system to the fault. The binder comprises a vicinal polyepoxide having an average of at least 1.8 reactive 1,2-epoxy groups per molecule, a stoichiometric amount of a triethylene glycol diamine or tetraethyleneglycol diamine curative and an accelerator comprising an effective amount of piperazine and triethanolamine.

The method is distinguished by short cure time to reach a load bearing capacity of 3000 psi in order to support motor vehicle traffic. The method is also distinguished by its compatibility with an existing cementitious road.

DETAILED DESCRIPTION OF THE INVENTION

Epoxy resin systems have been used to repair or resurface roadways because of their unique ability to bond well with Portland cement concrete. However, certain properties of the epoxy resin systems have limited their utility particularly in the repair of existing cementitious roads. These properties include slow cure rates, high coefficients of thermal expansion and high modulus of elasticity. We have invented an epoxy resin-aggregate system which overcomes these deficiencies.

The binder formulation of this invention is a low viscosity system which cures rapidly. High filler loadings are possible and compression and flexural strength develop quickly even at lower temperatures, e.g. 40° F. The coefficient of thermal expansion of a polymer concrete containing this binder system closely resembles that of Portland cement concrete up to about 120° F. Polymer concrete overlays containing this binder system resist delamination from a Portland cement concrete substrate during freeze-thaw cycling.

Nonylphenol may be used in this application because it improves flexibility. However, nonylphenol typically weakens the binder. There is also little need for the decorative, high gloss surface achieved with the addition of nonylphenol. Because of the high filler:binder ratios in this polymer concrete, there is very little of the binder system exposed on the surface of the overlay.

The invention is useful in preparing aggregate-filled systems for road and bridge repair, such as bridge deck overlays. The polymer concrete system of this invention has several properties that closely resemble properties of Portland cement concrete; these similarities offer improved durability of overlays and other types of repairs.

Generally the vicinal polyepoxide containing compositions which may be cured with the products of the invention are organic materials having an average of at least 1.8 reactive 1,2-epoxy groups per molecule. These polyepoxide materials can be monomeric or polymeric, saturated or unsaturated, aliphatic, cycloaliphatic, aromatic or heterocyclic, and may be substituted if desired with other substituents besides the epoxy groups, e.g., hydroxyl groups, ether radicals, aromatic halogen atoms and the like. These vicinal polyepoxide containing compounds typically are of an epoxy equivalent weight of 150 to 250. Preferably the polyepoxide, which has an epoxide equivalent weight of from 175 to 195, is derived from condensing epichlorohydrin with 2,2-bis(p-hydroxyphenyl)propane to form 2,2-bis[(p-2,3 epoxy propoxy)phenyl]propane, a derivative of bisphenol A.

Preferred polyepoxides are those of glycidyl ethers prepared by epoxidizing the corresponding allyl ethers or reacting, by known procedures, a molar excess of epichlorohydrin and an aromatic polyhydroxy compound, i.e. isopropylidene bisphenol, novolac, resorcinol, etc. The epoxy derivatives of methylene or isopropylidene bisphenols are especially preferred.

A widely used class of polyepoxides which are useful according to the instant invention includes the resinous epoxy polyethers obtained by reacting an epihalohydrin, such as epichlorohydrin, and the like, with either a polyhydric phenol or a polyhydric alcohol. Typically the epoxy resins have an average of at least 1.8 reactive, 1,2-epoxy groups per molecule. An illustrative, but by no means exhaustive, listing of suitable dihydric phenols includes 4,4'-isopropylidene bisphenol, 2,4'-dihydroxydiphenylethylmethane, 3,3'-dihydroxydiphenyldiethylmethane, 3,4'-dihydroxydiphenylmethylpropylmethane, 2,3'-dihydroxydiphenylethylphenylmethane, 4,4'-dihydroxydiphenylpropylphenylmethane, 4,4'-dihydroxydiphenylbutylphenylmethane, 2,2'-dihydroxydiphenylditolylmethane, 4,4'-dihydroxydiphenyltolylmethylmethane and the like. Other polyhydric phenols which may also be co-reacted with an epihalohydrin to provide these epoxy polyethers are such compounds as resorcinol, hydroquinone, substituted hydroquinones, e.g., methylhydroquinone, and the like.

Among the polyhydric alcohols which can be co-reacted with an epihalohydrin to provide these resinous epoxy polyethers are such compounds as ethylene glycol, propylene glycols, butylene glycols, pentane diols, bis(4-hydroxycyclohexy)dimethylmethane, 1,4-dimethylolbenzene, glycerol, 1,2,6-hexanetriol, trimethylolpropane, mannitol, sorbitol, erythritol, pentaerythritol, their dimers, trimers and higher polymers, e.g. polyethylene glycols, polypropylene glycols, triglycerol, dipentaerythritol and the like, polyallyl alcohol, polyhydric thioethers, such as 2,2'-3,3'-tetrahydroxydipropylsulfide and the like, mercapto alcohols such as monothioglycerol, dithioglycerol and the like, polyhydric alcohol partial esters, such as monostearin, pentaerythritol monoacetate and the like, and halogenated polyhydric alcohols such as the monochlorohydrins of glycerol, sorbitol, pentaerythritol and the like.

Another class of polymeric polyepoxides which can be cured to form the polymer concrete of the present invention includes the epoxy novolac resins obtained by reacting, preferably in the presence of a basic catalyst, e.g. sodium or potassium hydroxide, an epihalohydrin, such as epichlorohydrin, with the resinous condensate of an aldehyde, e.g. formaldehyde, and either a monohydric phenol, e.g., phenol itself, or a polyhydric phenol. Further details concerning the nature and preparation of these epoxy novolac resins can be obtained in Lee, H. and Neville, K., Handbook of Epoxy Resins, McGraw Hill Book Co., New York, 1967.

Because of the relative cost, it is desirable to minimize the amount of binder in any composition. To achieve this end, while maintaining a product of acceptable quality, the aggregate combination must be chosen to yields the smallest void volume. The aggregate formulation used in the Example is based on the results of the publication *Optimization of Polymer Concrete for Flame Spread Specimens*, by Troy Madeley, Technical Memorandum No. 2, University of Texas, Austin, Tex., July 1984. This publication reports that a combination of 60 wt% coarse gravel, 30 wt% coarse sand and 10 wt% fine material produced a low void volume. As a result, the aggregate used in the present work was 60 wt% of ⅜ inch gravel, 30 wt% sand and 10 wt% fly ash.

The aggregate-binder ratio was adjusted to yield the most workable system. Ratios of 7:1 to 12:1 were tried. It was found that for an aggregate based on ⅜ inch gravel, that the optimal weight ratio of aggregate-binder was 11:1. For an aggregate comprising pea gravel, a ratio of 8.5:1 was determined to be most workable. Compositions comprising more aggregate, i.e. greater than 12:1, were judged to be unworkable. Compositions comprising less aggregate than 7:1 ratio were judged not to be cost effective.

This invention is shown by way of Example.

EXAMPLE I

| A. Binder Formulation, pbw | 6109-5 |
|---|---|
| Liquid epoxy resin (EEW-188) | 100 |
| Triethyleneglycol diamine | 20 |
| Sand:binder ratio (wt.) | 7:1 |
| Compressive strength, psi after 24 hours at ambient temperatures | 8500 |
| Modulus of elasticity, psi after 24 hours at ambient temperatures | 3,171,000 |

This concrete system offered excellent compressive strength after curing 24 hours at ambient temperatures. Portland cement concrete has an ultimate compressive strength of about 400 psi after a much longer cure time.

| B. Binder formulation, pbw (6109) | -6A | -6B |
|---|---|---|
| Liquid epoxy resin (EEW 188) | 100 | 100 |
| Triethyleneglycol diamine | 20 | 20 |
| Accelerator 399 | 10 | 15 |
| Sand:Binder ratio (wt.) | 7:1 | 7:1 |
| Compressive strength, psi after 2 hours at ambient temperatures | 6700 | 7700 |

Addition of an accelerator to the epoxy concrete system cured with triethyleneglycol diamine resulted in improved compressive strength with time. Excellent compressive strength values were obtained within two hours of molding.

| C. Binder formulation, pbw (6109) | -7B | -7C |
|---|---|---|
| Liquid epoxy resin (EEW 188) | 100 | 100 |
| Triethyleneglycol diamine | 20 | — |
| Tetraethyleneglycol diamine | — | 28 |
| Accelerator 399 | 15 | 20 |

A three component aggregate blend (⅜-inch aggregate, sand, fly ash) was used in this example.

| | | |
|---|---|---|
| Filler:binder ratio (wt.) | 11:1 | 11:1 |
| Compressive strength, psi | | |
| after 3 hrs at ambient temp. | 10000 | 3500 |
| after 6 hrs at ambient temp. | 11200 | 8500 |
| after 9 hrs at ambient temp. | 13000 | 10600 |
| after 12 hrs at ambient temp. | 13300 | 10900 |
| after 24 hours at ambient temp. | 13500 | 11300 |
| Modulus of elasticity, psi after 24 hrs at ambient temp. | 5,093,000 | 4,018,000 |

Exceptional compressive strength was obtained after short cure times with the epoxy concrete system cured with triethyleneglycol diamine. Ultimate strength properties of systems cured with the two amines (triethyleneglycol diamine and tetraethyleneglycol diamine) are similar.

Accelerator 399 is a mixture of 10 to 20% piperazine and 5 to 10% N-aminoethylpiperazine in triethanolamine. Described in U.S. Pat. No. 4,189,564 to H. G. Waddill.

EXAMPLE II

| A.1 Formulations and Properties for Modified Binder System | | | | |
|---|---|---|---|---|
| Formulation, pbw | | | | |
| Liquid epoxy resin (EEW 188) | 100 | 100 | 100 | 100 |
| Triethyleneglycol diamine | 20 | 20 | 20 | 20 |
| Nonylphenol | 10 | 20 | 30 | 40 |
| Exotherm Data | | | | |
| Brookfield viscosity, cps (25° C.) | 900 | 1050 | 1550 | 2040 |
| Gel time, min. (200 g mass) | 23.2 | 17.8 | 15.3 | 13.6 |
| Peak exothermic temp., °C. | 235.5 | 215.6 | 201.8 | 186.9 |
| Time to peak temp., min. | 26.4 | 21.2 | 18.0 | 19.7 |
| Properties of cured ⅛-inch Castings Cured 14 days @ 25° C. | | | | |
| Shore D hardness, 0–10 sec | 73–70 | 71–68 | 71–67 | 70–66 |
| Elongation, % | 4.3 | 3.3 | 3.7 | 5.5 |
| HDT, °C., 264 psi/66 psi load | 49/50 | 45/48 | 46/48 | 42/42 |
| Izod impact strength, ft-lb/in | 0.10 | 0.16 | 0.09 | 0.07 |
| Tensile strength, psi | 9800 | 9500 | 8500 | 7700 |
| Tensile modulus, psi | 430000 | 400000 | 390000 | 350000 |
| Flexural strength, psi | 15600 | 15900 | 15600 | 13500 |
| Flexural modulus, psi | 470000 | 473000 | 438000 | 384000 |
| % wt. gain, | | | | |
| 24-hr water boil | 3.4 | 2.7 | 2.0 | 1.0 |
| 3-hour acetone boil | 11.3 | 14.4 | 13.3 | (1) |
| Compressive strength, psi | 23000 | 27400 | 22000 | 27000 |
| Adhesion Properties | | | | |
| Tensile shear adhesion, psi | 1000 | 920 | 990 | 860 |
| T-peel strength, pli | 3.1 | 2.3 | 1.6 | 2.2 |
| A.2 Formulation, pbw | | | | |
| Liquid epoxy resin (EEW 188) | 100 | 100 | 100 | 100 |
| Tetraethyleneglycol diamine | 28 | 28 | 28 | 28 |
| Nonylphenol | 10 | 20 | 30 | 40 |
| Properties of Cured ⅛-inch Castings Cured 14 days 25° C. | | | | |
| Shore D hardness, 0–10 sec | 76–73 | 74–70 | 73–68 | 68–61 |
| Elongation, % | 3.0 | 4.3 | 5.4 | 60 |
| HDT, °C., 264 psi/66 psi | 47/49 | 42/45 | 41/43 | 28/34 |
| Izod impact strength ft-lb/in | 0.11 | 0.11 | 0.10 | 0.09 |
| Tensile strength, psi | 8800 | 8500 | 7000 | 3300 |
| Tensile modulus, psi | 420000 | 420000 | 350000 | 230000 |
| Flexural strength, psi | 14200 | 13600 | 11300 | 5300 |
| Flexural modulus, psi | 440000 | 423000 | 350000 | 185000 |
| % wt. gain, | | | | |
| 24-hr water boil | 5.3 | 4.2 | 3.4 | 2.1 |
| 3-hr acetone boil | 13.7 | 16.3 | 17.0 | (1) |
| Compressive strength, psi | 32000 | 31000 | 34000 | 45000 |
| Adhesion Properties | | | | |
| Tensile shear adhesion, psi | 1500 | 1460 | 2300 | 2400 |
| T-peel strength, pli | 4.5 | 2.2 | 1.6 | 1.8 |

(1) Samples destroyed.

The two sets A.1 and A.2) of formulations and cured epoxy properties indicated that addition of nonylphenol to epoxy systems cured with these amines caused little change in strength properties of the neat systems. There is a maximum amount of nonylphenol that is useful. If more than that amount is added to a system, properties are damaged. Note the decrease in strength in the system cured with tetraethyleneglycol diamine when 40 phr of nonylphenol was added.

| B. Epoxy Concrete System/Formulations and Properties |  |
|---|---|
| Binder Formulation, pbw | |
| Liquid epoxy resin (EEW 188) | 100 |
| Triethyleneglycol diamine | 20 |
| Nonylphenol | 40 |
| Accelerator 399 | 5 |
| Aggregate Blend, pbw | |
| ⅜-inch aggregate | 60 |
| Coarse sand | 30 |
| Fly ash | 10 |

An 11:1 (wt.) aggregate:binder ratio was used in preparing samples for testing. The table below lists compressive and flexural strength values at varying cure times.

| Cure Time | Compressive Strength, psi | Flexural Strength psi |
|---|---|---|
| 3 hours | 5000 | — |
| 4 hours | — | 2100 |
| 6 hours | 8100 | 2600 |
| 12 hours | 9000 | 2600 |
| 24 hours | 9800 | 2700 |
| 7 days | 9500 | — |
| 28 days | 10200 | 2600 |

Although compressive strength may develop faster in systems containing larger amounts of the accelerator and no nonylphenol, those systems did not offer the enhanced flexibility these modified systems offer.

EXAMPLE III (Comparative)

| A. Binder Formulation, pbw (6109) | -3A | -3B |
|---|---|---|
| Liquid epoxy resin (EEW 188) | 100 | 100 |
| JEFFAMINE D-230 | 32 | — |
| JEFFAMINE D-400 | — | 55 |
| Sand:Binder Ratio (wt.) | 7:1 | 7:1 |
| Compressive strength, psi | 11077 | 5970 |

-continued

| A. Binder Formulation, pbw (6109) | -3A | -3B |
|---|---|---|
| after elevated temperature cure Modulus of elasticity, psi after elevated temperature cure | 2,806,000 | 810,000 |
| Compressive strength, psi after ambient temperature cure for 3 days | 8700 | 3900 |

Compressive strength and modulus values obtained after elevated temperature curing were about as high as they can be for these formulations because a complete cure was reached.

Compressive strength values obtained after a three-day cure at approximately 77° F. are somewhat lower than those listed earlier. Systems cured at ambient temperatures require longer cure times although they offer excellent properties even before a complete cure was reached.

Jeffamine ® D-230 and D-400 are represented by the structure:

$$H_2NCH(CH_3)CH_2-[OCH_2CH(CH_3)]_x-NH_2$$

wherein:
for D-230, x averages 2.6 and
for D-400, x averages 5.6.

| B. Binder formulation, pbw | 6109-4 |
|---|---|
| Liquid epoxy resin (EEW 188) | 100 |
| JEFFAMINE D-230 | 32 |
| Accelerator 399 | 20 |
| Sand:binder ratio (wt.) | 7:1 |

| Cure Time at Ambient Temperature, hrs | Compressive Strength, psi |
|---|---|
| 3.5 | 212 |
| 5 | 1542 |
| 7 | 4279 |
| 24 | 6939 |

Although compressive strength developed slowly during early curing, large increases in compressive strength were seen between 3.5 and 5 hours cure time and between 5 and 7 hours cure time. A more gradual increase was seen between 7 and 24 hours.

| C. Binder formulation, pbw | 6109-7A |
|---|---|
| Liquid epoxy resin (EEW 188) | 100 |
| JEFFAMINE ® D-230 | 32 |
| Accelerator 399 | 20 |

An aggregate blend containing ⅜-inch aggregate, sand, and fly ash was used in this example.

| Filler:Binder Ratio (wt.) | 11:1 |
|---|---|
| Compressive strength, psi after 24 hours | 12,209 |
| Modulus of Elasticity, psi after 24 hours | 4,041,000 |

Use of a three-component aggregate blend resulted in higher compressive strength and modulus because of improved packing. Also binder content of this system was lower than when only one aggregate was used; this would reduce the cost of the system.

EXAMPLE IV

| Accelerator 399 in Binder Formulation | |
|---|---|
| A. Binder A | |
| Liquid epoxy resin (EEW 188) | 100 pbw |
| JEFFAMINE D-230 | 32 pbw |
| Accelerator 399 | As specified |

| Accelerator Concentration, phr | Compression Strength, psi |
|---|---|
| 0 | Not cured at 24 hours |
| 5 | Not cured at 24 hours |
| 10 | 7780 psi at 24 hours |
| 15 | 7850 psi at 24 hours |
| 20 | 8700 psi at 24 hours |
| 25 | 6550 psi at 24 hours |
| 30 | Not workable |

Twenty (20) phr Accelerator 399 was determined to be the optimum amount of this accelerator to use for maximum compression strength after a 24-hour cure time.

| B. Binder B | |
|---|---|
| Liquid epoxy resin (EEW 188) | 100 pbw |
| Triethyleneglycol diamine | 20 pbw |
| Accelerator 399 | As specified |

| Accelerator Concentration, phr | Compression Strength, psi |
|---|---|
| 0 | Not cured at 3.5 hours |
| 5 | Not cured at 2 hours |
| 10 | 4650 psi at 1.5 hours |
| 15 | 5200 psi at 1.5 hours |
| 20 | Not Workable |

Fifteen (15) phr Accelerator 399 was the optimum amount of this accelerator to use for maximum compression strength in the shortest amount of time.

| C. Binder C | |
|---|---|
| Liquid epoxy resin (EEW 188) | 100 pbw |
| Tetraethyleneglycol diamine | 28 pbw |
| Accelerator 399 | As specified in table |

| Accelerator Concentration, phr | Compression Strength, psi |
|---|---|
| 0 | Not cured at 3 hours |
| 5 | Not cured at 2.5 hours |
| 10 | Not cured at 2.5 hours |
| 15 | 3400 psi at 2.5 hours |
| 20 | 3500 psi at 2.5 hours |
| 25 | Not Workable |

Twenty (20) phr Accelerator 399 was the optimum amount of this accelerator to use for maximum compression strength in the shortest amount of time.

Binder A cures quite slowly, even with large amounts of Accelerator 399 added to the system. Binders B and C both cured rapidly. However, for the repair-type applications in which this invention is useful, it is necessary to obtain the highest compression strength in the least amount of time. It is also desirable to keep accelerator levels as low as possible. For these reasons, Binder B is the preferred formulation.

EXAMPLE V

Compression Strength Development at Three Temperatures

PC-A (Polymer Concrete A) contains 11 pbw of the 3-component aggregate mix described earlier for each 1 pbw of Binder A of Example I.

PC-B (Polymer Concrete B) contains 11 pbw of the 3-component aggregate mix described earlier for each 1 pbw of Binder B of Example I.

PC-C (Polymer Concrete C) contains 11 pbw of the 3-component aggregate mix described earlier for each 1 pbw of the Binder C of Example I.

| Compression strength, psi | PC-A | PC-B | PC-C |
|---|---|---|---|
| Compression Strength Development at 40° F. for Three Polymer Concrete Systems. Time Required to Reach Specified Compression Strength. | | | |
| 2000 | >24 hr. | 5 hr. | 6.5 hr. |
| 3000 | >24 | 5.25 | 8 |
| 4000 | >24 | 5.5 | 9.5 |
| 5000 | >24 | 5.75 | 11 |
| 6000 | >24 | 6 | 12.5 |
| Compression Strength Development at 70° F. For Three Polymer Concrete Systems. Time Required to Reach Specified Compression Strength. | | | |
| 2000 | 6.25 hr. | <0.5 hr. | 1.25 hr. |
| 3000 | 7.25 | | 1.75 |
| 4000 | 8 | 1 | 2.25 |
| 5000 | 9 | | 3 |
| 6000 | 9.5 | 1.5 | 3.5 |
| Compression Strength Development at 110° F. for Three Polymer Concrete Systems. Time Required to Reach Specified Compression Strength. | | | |
| 2000 | 1 hr. | <0.5 hr. | 0.75 hr. |
| 3000 | 1.5 | | 1.25 |
| 4000 | 2 | 0.5 | 2.25 |
| 5000 | 2.5 | | 6 |
| 6000 | 3 | 0.75 | 10.25 |

PC-A, the polymer concrete containing Jeffamine D-230 curing agent, did not cure at 40° F. and cured slowly at 70° F. PC-C, which contained tetraethyleneglycol diamine, cured slowly at 40° F. PC-B was the preferred formulation; this system cured quite rapidly at 70° F. Even at 40° F., this concrete system developed compression strength much more quickly than the other two systems.

EXAMPLE VI

| Flexural strength, psi | PC-A | PC-B | PC-C |
|---|---|---|---|
| Flexural Strength Development at 40° F. for Three Polymer Concrete Systems. Time Required to Reach Specified Flexural Strength. | | | |
| 500 | >24 hr. | 2 hr. | 5.25 hr. |
| 1000 | >24 | 3.5 | 7 |
| 1500 | >24 | 6.25 | 7.75 |
| 2000 | >24 | 18 | 8.75 |
| 2500 | >24 | 22 | 17.75 |
| Flexural Strength Development at 70° F. for Three Polymer Concrete Systems. Time Required to Reach Specified Flexural Strength. | | | |
| 500 | 6.5 hr. | 1.5 hr. | 2.25 hr. |
| 1000 | 7.5 | 2.25 | 2.75 |
| 1500 | 8.25 | 2.5 | 3.25 |
| 2000 | 9.5 | 2.75 | 4.5 |
| 2500 | 11 | 3 | 6.5 |
| Flexural Strength Development at 110° F. for Three Polymer Concrete Systems. Time Required to Reach Specified Flexural Strength. | | | |
| 500 | 1 hr. | <0.25 hr. | 1 hr. |
| 1000 | 2 | 0.5 | 1.75 |
| 1500 | 2.75 | 1 | 2.75 |
| 2000 | 3.25 | 1.25 | 4.25 |
| 2500 | 5.5 | 2 | 6.25 |

Portland cement concrete has about 500 psi flexural strength. It is important that the polymer concrete exceed 500 psi in a short time. Both PC-A and PC-C cure slowly in comparison with PC-B. Even at 40° F., PC-B reached the 500 psi flexural strength within two hours.

EXAMPLE VII

| | Coefficient of Thermal Expansion at Varying Temperatures for Three Polymer Concrete Systems | | |
|---|---|---|---|
| | Coefficient of Thermal Expansion, in/in/°F. $\times 10^{-6}$ | | |
| Temperature, °F. | PC-A | PC-B | PC-C |
| 0 | 0.00 | 4.20 | 1.03 |
| 40 | 3.97 | 4.20 | 5.83 |
| 80 | 8.26 | 4.20 | 10.58 |
| 120 | 13.1 | 16.4 | 15.4 |
| 158 | 17.6 | 16.4 | 20.0 |

The coefficient of thermal expansion for Portland cement concrete is $5.5 \times 10^{-6}$ in/in/°F. It is important that a polymer concrete system used in conjunction with normal concrete (such as a polymer concrete overlay on Portland cement concrete) have a coefficient of thermal expansion similar to that of concrete. If an overlay expands and contracts to a much greater degree than the material it covers every time the temperature changes, it will break loose from the substrate (or delaminate) and will not provide the protection it was designed to provide.

PC-B has a coefficient of thermal expansion that is constant up to greater than 80° F.; this thermal expansion is similar to that of Portland cement concrete. Above 120° F., the coefficient for PC-B is higher, but is still constant and is ultimately lower than the coefficients for either of the other polymer concrete systems.

EXAMPLE VIII

| Comparison of Three Epoxy Polymer Concretes with Portland Cement Concrete (PCC) Typical Properties of Portland Cement Concrete and Polymer Concrete After 28 Days Cure at Ambient Temperatures | | | | |
|---|---|---|---|---|
| | PCC | PC-A | PC-B | PC-C |
| Compression strength, psi | 3000–5000 | 14000 | 15000 | 13000 |
| Compression modulus, psi $\times 10^6$ | 3–4 | 3.9 | 4.2 | 3.9 |
| Flexural strength, psi | 410–530 | 2900 | 2800 | 3000 |

All three of the polymer concrete systems were considerably stronger than Portland cement concrete after a standard 28-day cure time. Modulus values are similar for the three polymer concrete systems and the Portland cement concrete; this similarity indicated that these epoxy systems are no more rigid than Portland cement concrete.

| Table of Test Methods | |
|---|---|
| Gel Time (minutes) | ASTM D-2471-71 |
| Shore D-Hardness 0–10 seconds | ASTM D-2240 |
| Elongation at Break (%) | ASTM D-638 |
| Heat Deflection Temperature (HDT) (°C., 264 psi/66 psi) | ASTM D-648 |
| Izod Impact Strength (ft lbs/in) | ASTM D-256 |
| Tensile Strength (psi) | ASTM D-638 |
| Tensile Modulus (psi) | ASTM D-638 |
| Flexural Strength (psi) | ASTM D-790 |
| Flexural Modulus (psi) | ASTM D-790 |
| Compression Strength (psi) | ASTM D-695 |
| T-peel Strength (pli) | ASTM D-1876 |
| Tensile Shear Strength (psi) | ASTM D-1002 |
| Modulus of Elasticity-Concrete (psi) | ASTM C-469-83 |
| Brookfield Viscosity (cps @ 25° C.) | ASTM D-1824 |
| Compression Modulus-Concrete (psi) | ASTM C-469-83 |
| Compression Strength-Concrete (psi) | ASTM C-3983b |
| Flexural Strength-Concrete (psi) | ASTM C-78-75 |

While particular embodiments of the invention have been described, it is well understood that the invention is not limited thereto since modifications may be made. For example, the amount of accelerator may be adjusted with ambient temperature to ensure adequate strength development after short cure times. Nonylphenol may be added to improve flexibility if the decrease in strength is acceptable. It is therefore contemplated to cover by the appended claims any such modifications as fall within the spirit and scope of the claims.

What is claimed is:

1. A method for repairing a fault in a cementitious road, comprising applying to the fault a composition comprising:
   A. A binder comprising:
      (1) a vicinal polyepoxide having an average of at least 1.8 reactive 1,2-epoxy groups per molecule;
      (2) a stoichiometric amount of a curing agent comprising triethyleneglycol diamine;
      (3) an accelerator comprising an effective amount of piperazine, and
   B. aggregate.

2. The method of claim 1 wherein the aggregate comprises gravel, sand and fly ash.

3. The method of claim 1 wherein the aggregate:binder weight ratio is 7:1 to 12:1.

4. The method of claim 1 wherein the binder additionally comprises nonylphenol.

5. A method for coating a cementitious road comprising applying to the surface of the road a composition comprising:
   A. A binder comprising:
      (1) a vicinal polyepoxide having an average of at least 1.8 reactive 1,2-epoxy groups per molecule;
      (2) a stoichiometric amount of a curing agent comprising triethyleneglycol diamine;
      (3) an accelerator comprising an effective amount of piperazine, and
   B. aggregate comprising gravel, sand and fly ash
wherein the aggregate:binder weight ratio is 7:1 to 12:1.

6. The method of claim 5 wherein the binder additionally comprises nonylphenol.

7. A method for repairing a fault in a cementitious road, comprising applying to the fault a composition comprising:
   A. A binder comprising:
      (1) a vicinal polyepoxide having an average of at least 1.8 reactive 1,2-epoxy groups per molecule;
      (2) a stoichiometric amount of a curing agent comprising tetraethyleneglycol diamine;
      (3) an accelerator comprising an effective amount of piperazine, and
   B. aggregate.

8. The method of claim 7 wherein the aggregate comprises gravel, sand and fly ash.

9. The method of claim 7 wherein the aggregate:binder weight ration is 7:1 to 12:1.

10. The method of claim 7 wherein the binder additionally comprises nonylphenol.

11. A method for coating a cementitious road comprising applying to the surface of the road a composition comprising:
    A. A binder comprising:
       (1) a vicinal polyepoxide having an average of at least 1.8 reactive 1,2-epoxy groups per molecule;
       (2) a stoichiometric amount of a curing agent comprising tetraethyleneglycol diamine;
       (3) an accelerator comprising an effective amount of piperazine, and
    B. aggregate comprising gravel, sand and fly ash
wherein the aggregate:binder weight ratio is 7:1 to 12:1.

12. The method of claim 11 wherein the binder additionally comprises nonylphenol.

* * * * *